US012780341B2

(12) United States Patent
Kipping

(10) Patent No.: US 12,780,341 B2
(45) Date of Patent: Nov. 3, 2026

(54) ELECTRONIC FRAME LOCK

(71) Applicant: ABUS August Bremicker Söhne KG, Wetter-Volmarstein (DE)

(72) Inventor: Andreas Kipping, Selbach (DE)

(73) Assignee: ABUS August Bremicker Söhne KG, Wetter-Volmarstein (DE)

( * ) Notice: Subject to any disclaimer, the term of this patent is extended or adjusted under 35 U.S.C. 154(b) by 209 days.

(21) Appl. No.: 18/740,631

(22) Filed: Jun. 12, 2024

(65) Prior Publication Data

US 2024/0425131 A1 Dec. 26, 2024

(30) Foreign Application Priority Data

Jun. 20, 2023 (DE) ........................ 102023116143.1

(51) Int. Cl.
*B62H 5/14* (2006.01)

(52) U.S. Cl.
CPC .................................... *B62H 5/14* (2013.01)

(58) Field of Classification Search
CPC ... B62H 5/14; Y10T 70/5872; Y10T 70/7047; B60R 25/02153
USPC ..................................................... 70/40, 233
See application file for complete search history.

(56) References Cited

U.S. PATENT DOCUMENTS

| | | | | |
|---|---|---|---|---|
| 11,299,916 | B2 * | 4/2022 | Hentschel | E05B 47/0012 |
| 11,414,894 | B2 * | 8/2022 | Müller | B62H 5/147 |
| 2020/0023917 | A1 * | 1/2020 | Hu | E05B 71/00 |
| 2020/0070912 | A1 | 3/2020 | Müller et al. | |

FOREIGN PATENT DOCUMENTS

| | | | | |
|---|---|---|---|---|
| CA | 3230403 | A1 * | 7/2023 | E05B 67/22 |
| CN | 201100043 | Y * | 8/2008 | |
| CN | 205632760 | U | 10/2016 | |
| CN | 206903400 | U | 1/2018 | |
| CN | 206917434 | U | 1/2018 | |
| CN | 211714831 | U | 10/2020 | |
| DE | 102005041268 | A1 | 3/2007 | |
| DE | 102018121245 | A1 | 3/2020 | |
| WO | 2020083192 | A1 | 4/2020 | |

* cited by examiner

*Primary Examiner* — Suzanne L Barrett
(74) *Attorney, Agent, or Firm* — Dickinson Wright PLLC

(57) ABSTRACT

An electronic frame lock has a control device that is configured, starting from an open position of a round hoop of the frame lock, based on a closing command, to control an electric motor to rotate a cam into a release position and, as a result, to move a latch preloaded into a locking position into an unlocking position; to then control the electric motor to rotate the cam into a preloading position in which the latch is released for a movement towards the unlocking position; and, on a detection of a closed position of the round hoop, to control the electric motor to rotate the cam into a blocking position in which the cam secures the latch in the locking position.

20 Claims, 4 Drawing Sheets

Prior Art

Prior Art

S, V, G

T

ELECTRONIC FRAME LOCK

CROSS-REFERENCE TO RELATED APPLICATION

This application claims the benefit of and priority to German Patent Application No. 102023116143.1 filed on Jun. 20, 2023. The entire disclosure of the above application is incorporated herein by reference.

FIELD OF THE INVENTION

The invention relates to an electronic frame lock for a bicycle.

BACKGROUND OF THE INVENTION

Such frame locks may, for example, be fastened to a frame of a bicycle and have a round hoop that, in a closed position, may engage through one of the wheels between two spokes to thereby secure the bicycle against an unauthorized riding away. In an open position, the round hoop may, however, be retracted from a space in which the wheel rotates during a trip with the bicycle in order to release the bicycle for such a trip. For example, a bicycle that may be secured by such a frame lock may be configured as a two-wheeler, wherein frame locks may, however, also be used to secure three-wheeled or four-wheeled bicycles, such as cargo bikes. The bicycle may be muscle-powered, motor-powered or motor-assisted, in particular by an electric motor (e.g. an e-bike or pedelec, electric tricycle, electric wheelchair, electric quad bike or similar).

For example, such a frame lock is known from DE 10 2005 041 268 A1, wherein, in this frame lock, a latch is provided which is preloaded towards a locking position and by means of which the round hoop may be secured in the closed position and the open position. Furthermore, in the frame lock, a blocking spring is provided that is configured to secure the latch in the locking position against a movement against the preload in order to thereby in particular protect the lock against unauthorized opening attempts using the so-called hammer blow method. With this method, an attempt is made to briefly urge a preloaded latch back against the preload by a blow and to use this time window to move the round hoop out of the closed position. However, the blocking spring secures the latch against such an urging back due to a blow.

However, to enable the authorized user to move the latch into an unlocking position and to move the round hoop between the open position and the closed position, in the known frame lock, a shaft is provided that is rotatable by an electric motor and that has an unlocking cam, wherein, when the shaft rotates, the latch may be urged into the unlocking position by the unlocking cam. Furthermore, at the shaft, a release nose is formed that cooperates with a compulsory guidance surface of the blocking spring and that urges the blocking spring back during the rotation of the shaft such that the blocking spring releases the latch for the movement into the unlocking position.

In this prior art, the latch may thus be secured against an unauthorized movement into the unlocking position, but this requires a separate component in the form of the blocking spring and the reliability of the securing of the latch and/or the operability of the frame lock may be impaired by wear of the blocking spring or of its compulsory guidance surface as the service life increases. Furthermore, a difficulty in the handling of the frame lock results since a user has to hold the round hoop manually, for example after a transfer into the closed position, until the shaft is rotated sufficiently far such that the latch is released for a movement into the locking position. If the round hoop reaches the closed position before the latch is released and if the round hoop is not held in the closed position by a user, the round hoop preloaded into the open position, however, returns in an unwanted manner to the open position.

SUMMARY OF THE INVENTION

It is therefore an object of the invention to provide an electronic frame lock that enables a more reliable securing against unauthorized opening attempts, in particular the hammer blow method, as well as a simplified handling.

This and other objects of the invention are satisfied by an electronic frame lock having the features of claim 1.

The electronic frame lock of the present invention comprises a round hoop that is rotatable between an open position and a closed position; an electric motor; a cam that may be driven by the electric motor to make an eccentric rotational movement about an axis of rotation; a latch that is movable in a straight line between a locking position and an unlocking position perpendicular to the axis of rotation and radially to the round hoop and that is preloaded towards the locking position; a hoop detector that is configured to detect the closed position of the round hoop; and a control device. The round hoop located in the closed position may further be secured against a movement towards the open position by the latch located in the locking position and may be released for a movement into the open position by moving the latch into the unlocking position.

Furthermore, the cam may be rotated by the electric motor into a blocking position, a preloading position and a release position and the latch has a control opening into which the cam engages. The latch may therefore be driven by rotating the cam in accordance with the rotational movement of the cam and a contour of the control opening.

Further, the latch may be secured by the cam against a movement from the locking position towards the unlocking position by rotating the cam into the blocking position, may be released for a movement against the preload towards the unlocking position by rotating the cam into the preloading position, and may be moved by the cam against the preload into the unlocking position by rotating the cam into the release position.

Furthermore, the control device is configured to control the electric motor to selectively rotate the cam into the blocking position, the preloading position and the release position, wherein the control device is further configured to control the electric motor to rotate the cam into the blocking position in response to a detection of the closed position of the round hoop by the hoop detector.

Since the cam is configured to engage into the control opening of the latch and to secure the latch in the blocking position against a movement from the locking position towards the unlocking position, the cam, which is also provided for moving the latch from the locking position into the unlocking position, may thus directly serve to secure the latch in the locking position. It is therefore not necessary to use a separate component to secure the latch; rather, the cam that is anyway required to move the latch into the unlocking position may also be used to secure the latch. Furthermore, the cam may as, so to speak, a central mechanical component for moving the latch, and thus for controlling the locking mechanism, often be configured stably so that this stability may also be used for securing the latch in the locking position. This enables an easier and more reliable securing of the frame lock against the unauthorized opening attempts using the hammer blow method compared to the prior art.

In the preloading position of the cam, the latch is released for a movement against the preload towards the unlocking position and may in particular be movable between the locking position and the unlocking position. The rotation of the cam into the preloading position makes it possible to already prepare the latch for an engagement for blocking the round hoop in the closed position, but to permit a displacement towards the unlocking position in this respect. Therefore, when the cam is rotated into the preloading position, the latch may, for example, slide along the round hoop during a movement of the round hoop from the open position into the closed position in order to, however, on reaching the closed position, be able to immediately move into the locking position due to the preload and be able to secure the round hoop against a movement towards the open position. The round hoop may hereby in particular already be secured against a movement back into the open position so that a user, for example even in embodiments in which the round hoop is preloaded into the open position, only has to rotate the round hoop into the closed position, but does not have to hold it there manually until the cam has been rotated into the blocking position.

Furthermore, the rotation of the cam into the release position makes it possible, by correspondingly controlling the electric motor, to move the latch into the unlocking position and, for example, to bring it out of engagement with a closed position engagement recess to be able to release the round hoop for a movement into the open position. In this regard, a fully electronic control of the latch may be achieved.

The configuration of the control device to be able to intentionally control the electric motor to rotate the cam into the blocking position, the preloading position and the release position may further enable a situation-dependent positioning of the latch to be able to achieve an improved handling of the lock and in particular an automatic blocking of the round hoop in the closed position. For example, during a movement of the round hoop out of the open position towards the closed position, the cam may for this purpose already be rotated into the preloading position by appropriate control of the electric motor in order to prepare an automatic locking of the round hoop on reaching the closed position.

Furthermore, by designing the frame lock with a hoop detector for detecting the closed position, it may be achieved that the control device, in response to a corresponding signal of the hoop detector, may control the electric motor to rotate the cam into the blocking position upon reaching the closed position in order to automatically secure the latch by the cam against a movement from the locking position. To a certain extent, due to an automatic engagement of the latch upon reaching the closed position by a previous rotation of the cam into the preloading position, a temporary securing of the round hoop against a movement back into the open position may thus be achieved, whereupon, due to the automatic rotation of the cam into the blocking position due to the signal of the hoop detector, a fixing of the latch in the locking position and thus a reliable locking of the round hoop against possible break-open attempts may take place.

To be able to selectively drive the latch into the unlocking position and block it in the locking position, the cam may in particular be configured to directly mechanically contact the latch. In this regard, provision may in particular be made that no further drive transmission elements are arranged between the cam and the latch, but that the latch may be secured in the locking position by a direct engagement of the cam and may be moved into the unlocking position.

Since the latch is movable in a straight line between the locking position and the unlocking position perpendicular to the axis of rotation of the cam and radially to the round hoop, the latch may in particular be movable along a direction of movement that is oriented perpendicular to the axis of rotation of the cam and radially to the round hoop.

Further embodiments can be seen from the dependent claims, the description, and the drawings.

In some embodiments, the round hoop may have a closed position engagement recess and the latch may be configured to engage into the closed position engagement recess in the locking position when the round hoop is in the closed position and to thereby secure the round hoop against a movement into the open position.

In particular, provision may therefore be made that, when the cam is positioned in the preloading position, the latch is configured, upon reaching the closed position, to move directly into the locking position and to snap into the closed position engagement recess in order to thereby block the round hoop against a movement towards the open position.

In some embodiments, the control device may be configured, starting from the open position of the round hoop, and based on a closing command received, to first control the electric motor to rotate the cam into the release position and, as a result, to move the latch into the unlocking position; to then control the electric motor to rotate the cam into the preloading position; and to control the electric motor to rotate the cam into the blocking position in response to a detection of the closed position of the round hoop by the hoop detector.

In such embodiments, the possibility of being able to selectively block the latch in the locking position, release it for a movement out of the locking position, or move it into the unlocking position solely by rotating the cam may thus be intentionally used when controlling the frame lock during a transfer of the round hoop from the open position into the closed position. For this purpose, the control device may be configured, based on a closing command received, when the round hoop is in the open position, to first control the electric motor to rotate into the release position and, as a result, move the latch into the unlocking position. The round hoop may in particular be releasable for a movement into the closed position by this movement of the latch into the unlocking position.

A user may then, for example, start to move the round hoop, in particular against a preload, towards the closed position and the control device may control the electric motor to rotate the cam into the preloading position. The latch may thereby, in particular during a further movement of the round hoop towards the closed position, slide along the round hoop in order to, upon reaching the closed position, for example snap into the aforementioned closed position engagement recess due to the preload and to secure the round hoop in the closed position. The control device may in particular be configured to control the electric motor to rotate the cam into the preloading position if the round hoop has been moved out of the open position.

By designing the frame lock with a hoop detector, the reaching of the closed position may be detected and a corresponding signal may in particular be transmitted to the control device that may then control the electric motor to rotate the cam into the blocking position and may thereby secure the latch in the locking position, in particular against the hammer blow method. A user thus only has to transmit the closing command and move the round hoop into the closed position, whereupon the securing of the round hoop against a movement into the open position by a snapping of the latch into the closed position engagement recess and thereupon the reliable locking of the round hoop in the closed position by rotating the cam into the blocking position may take place completely automatically.

The control device may in particular be configured to stop the electric motor on reaching the preloading position and to only control the electric motor to further rotate the cam as a result of the detection of the closed position. Therefore, during the described control cycle for moving the round hoop from the open position into the closed position, the cam may in particular not rotate continuously, but may at least briefly remain in the respective positions, the unlocking position and the preloading position.

For example, the frame lock may have a radio receiver to be able to receive the closing command via a wireless connection. Such a radio connection may in particular be a mobile radio connection, a WLAN/WiFi connection and/or a Bluetooth connection. The frame lock may further be configured to receive the closing command from a smartphone. Furthermore, it may, for example, also be provided that the radio receiver is configured to communicate with a handheld transmitter specifically set up for this purpose and associated with the frame lock and/or with a remote control associated with the frame lock.

In some embodiments, the control device of the frame lock may also be connected and/or connectable to a control unit of an e-bike to be able to receive the closing command from such a control unit. Here, a communication between the control unit of the e-bike and the control device of the frame lock may generally be provided via a radio connection and/or via a cable connection.

Furthermore, in some embodiments, an encrypted transmission of a signal for transmitting the closing command may be provided.

As an alternative to such a reception, the frame lock may also be configured to receive the closing command by entering a numerical code or a biometric code, for example a fingerprint, for which purpose corresponding input devices may be provided at the frame lock. The closing command may generally be a command by which a user may indicate that he wants to close the frame lock and move the round hoop into the closed position. The closing command may therefore also result depending on the situation due to a received command to move the latch into the unlocking position if the round hoop is in the open position at the time of the receiving of this command since, in this case, the frame lock is obviously locked and the round hoop is to be moved into the closed position.

In some embodiments, the cam may be rotatable about a motor axis of rotation of the electric motor. In such embodiments, the axis of rotation may consequently correspond to the motor axis of rotation without, however, the cam necessarily having to be directly connected to a motor shaft of the electric motor. Rather, in some embodiments, for example, a gear may also be effective between the electric motor and the cam, in particular a coaxially designed gear, wherein a slowing down of the rotational speed of the electric motor may in particular take place by such a gear.

Furthermore, in some embodiments, provision may be made that the cam is rotatable about an axis of rotation aligned in parallel with the motor axis of rotation of the electric motor. In such embodiments, the cam may also be connected to the electric motor via a gear, for example.

In some embodiments, the electric motor may be arranged substantially tangentially to the round hoop. Such a tangential arrangement of the electric motor may in particular enable a design of the frame lock with a low overall height to be able to attach the frame lock to a frame of the bicycle in a space-saving manner.

Furthermore, the electric motor, the cam and the latch may be arranged behind one another in this order viewed along the axis of rotation.

In some embodiments, the cam may have a control prolongation with which the cam engages into the control opening. In some embodiments, the control prolongation may in particular project away from a control plate of the cam towards the latch to be able to engage into the control opening and to be guidable along the contour of the control opening. For example, such a control plate may be pivotable about the axis of rotation, wherein the control prolongation may, for example, be arranged at a radial end of such a pivotable control plate with respect to the axis of rotation to be able to perform an eccentric rotational movement. Furthermore, in some embodiments the control prolongation may also be arranged on a disk-shaped control plate and eccentrically to the axis of rotation so that the control plate may be configured as a disk rotatable about the axis of rotation in such embodiments.

In some embodiments, the control opening may have a preloading section that has a first extent along a direction of movement of the latch. Furthermore, the control device may have a locking section that has a second extent along the direction of movement of the latch that is smaller than the first extent, wherein the control prolongation of the cam is arranged in the preloading section in the preloading position and is arranged in the locking section in the release position and in the blocking position.

As already mentioned, the direction of movement of the latch may be oriented radially to the round hoop and perpendicular to the axis of rotation of the cam. Since the cam may be arranged in the preloading section of the control opening in the preloading position, the latch may be movable between the locking position and the unlocking position in the preloading position without the control prolongation previously abutting a boundary of the control opening. On the other hand, the locking section, which is less extended along the direction of movement of the latch compared to the preloading section, may enable the control prolongation, in the course of the rotation of the cam, to abut a respective boundary of boundaries of the control opening that are opposite one another with respect to the direction of movement of the latch in order to drive the latch into the unlocking position during a rotation into the release position or to secure the latch in the locking position by a rotation into the blocking position.

In some embodiments, the extent of the locking section along the direction of movement of the latch may be less than a spacing between a position of the control prolongation in the blocking position and a position of the control prolongation in the release position. Due to such a dimensioning of the locking section, it may be achieved that the control prolongation may abut a boundary of the locking section, for example during a movement from the blocking position into the release position, and may displace the latch against the preload into the unlocking position in the course of further rotation into the release position.

In some embodiments, the control prolongation may, in the release position, contact a boundary of the control opening facing away from the round hoop and, in the blocking position, may contact a boundary of the control opening facing the round hoop. Due to the contact of the control prolongation with the boundary facing the round hoop in the blocking position, it may in particular be achieved that the latch is blocked by the control prolongation against a movement leading away from the round hoop in order to thereby secure the latch in the locking position. However, the control prolongation may abut a boundary of the control opening facing away from the round hoop in the course of a rotation into the release position and, by cooperating with this boundary, may displace the latch against the preload into the unlocking position.

In general, the contour of the control opening may therefore be formed by a boundary of the control opening. The control opening may further be formed as an opening in the latch in the manner of a window, which opening is bounded at the outside by a boundary defining the contour of the control opening.

In some embodiments, the latch may be configured as a flat metal sheet. A more compact design of the frame lock may hereby also be achieved.

In some embodiments, the latch may have a concavely rounded recess facing the round hoop. The recess may in particular be configured, in the locking position of the latch, to engage around a section of the round hoop that is convexly rounded in a manner complementary thereto.

In some embodiments, the round hoop may have guide sections including the convexly rounded section of the round hoop, wherein the closed position engagement recess may be formed at the guide sections and/or in the environment of the guide sections. Side surfaces of the latch that are opposite one another with respect to the axis of rotation and that may surround the aforementioned rounded recess may in particular abut boundaries of the closed position engagement recess in the locking position to prevent a movement of the round hoop.

Furthermore, in some embodiments, the latch may have lateral centering recesses that are configured to support the latch at the guide sections of the round hoop and/or to laterally enclose the guide sections during a sliding along the round hoop in the preloading position.

In some embodiments, the round hoop may be preloaded into the open position. To transfer the round hoop from the open position into the closed position, in such an embodiment a handle to be manually actuated may therefore be provided by means of which the round hoop may be transferrable against the preload into the closed position. However, starting from the closed position, the round hoop may be automatically transferrable into the open position due to the preload if the latch has been transferred into the unlocking position and out of engagement with the closed position engagement recess by means of the cam, in particular in response to an opening command. Furthermore, it may be achieved by such a preload that the round hoop, for example on an incomplete transfer into the closed position, automatically returns to the open position so that a user may perceive that the frame lock has not been transferred into the closed position and therefore, for example, a bicycle that may be secured by the frame lock is not yet blocked against a riding away.

In some embodiments, the hoop detector may be configured to detect the open position. In such embodiments, a signal may therefore be transmitted to the control device in particular both when the round hoop is in the closed position and when the round hoop is in the open position. The control device may be configured to consider the signals of the hoop detector when controlling the electric motor and/or to distinguish the closed position from the open position based on the signals.

In some embodiments, the round hoop may have an open position engagement recess and the latch may be configured to engage into the open position engagement recess in the locking position when the round hoop is in the open position and to thereby secure the round hoop against a movement into the closed position.

Such a securing of the round hoop in the open position may in particular prevent an unwanted movement of the round hoop into the closed position, for example during a trip with the bicycle. In such embodiments, the round hoop—in particular if the round hoop is additionally preloaded towards the open position—may always be arranged in two clearly defined positions and either in the closed position or in the open position in that the round hoop may be securable in these two positions by the latch against a movement into the respective other position.

In some embodiments, the control device may be configured, after receiving the closing command, to control the electric motor to move the cam into the blocking position after a predefined or predefinable waiting time if the hoop detector detects the open position after the predefined or predefinable waiting time.

In such embodiments, the control device may consequently be configured to check whether the round hoop has actually been moved out of the open position as a result of a closing command, or whether the round hoop has been left in the open position. If the hoop detector still detects the open position after the waiting time, the round hoop was not moved despite the closing command received. By controlling the electric motor to move the cam into the blocking position, it may be achieved in such situations that the latch is blocked again in the locking position and that the round hoop is thereby secured in the open position. An unwanted remaining of the latch in the unlocking position and a thereby induced release of the round hoop for a movement into the closed position, which could, for example, lead to a movement of the round hoop due to vibrations occurring during a trip with the bicycle, may thereby be avoided.

For example, the waiting time may be stored by the manufacturer in the control device, for example in a non-volatile memory of the control device, and may thereby be predefined. However, provision may also be made that a user may predefine the waiting time himself or herself and may, for example, write it to such a memory. The waiting time may, for example, be in a range of 1 s to 30 s, wherein, however, other waiting times, for instance in the range of one minute, may generally also be predefined or predefinable. In particular, a freely predefinable waiting time may furthermore also enable an unrestricted setting of the waiting time. For example, the waiting time may be adaptable by a setting at a smartphone, wherein the selected value of the waiting time may be transmittable to a radio receiver of the frame lock via a radio connection.

Furthermore, in some embodiments, the control device may be configured to control the electric motor, after the rotation of the cam into the release position, to rotate the cam into the preloading position only in response to a signal of the hoop detector that characterizes a movement of the round hoop out of the open position.

Such a signal that characterizes a movement of the round hoop from the open position may in particular be an interruption of a signal of the hoop detector by which the control device is informed of the arrangement of the round hoop in the open position. Alternatively or additionally, the hoop detector may, however, also comprise a further sensor to detect the round hoop between the open position and the closed position, wherein the control device may be configured to control the electric motor to rotate the cam into the preloading position in response to a signal of the further sensor.

In such embodiments, provision may in particular be made that the control device is configured to hold the cam in the release position after receiving the closing command until either a movement towards the closed position has taken place or the waiting time has elapsed. In the first case, the control device may then control the electric motor to rotate the cam into the preloading position to enable a snapping into the closed position engagement recess, whereas, in the second case, the control device may control the electric motor to rotate the cam into the blocking position to secure the round hoop in the open position again.

In some embodiments, the control device may be configured, starting from the closed position of the round hoop, based on an opening command received, to first control the electric motor to move the cam into the release position and, as a result, to move the latch into the unlocking position. Furthermore, the control device may be configured to then control the electric motor to rotate the cam into the blocking position in response to a detection of the open position of the round hoop by the hoop detector.

The opening command may, for example, also be receivable at a radio receiver of the frame lock and/or transmittable by means of a smartphone. The opening command may in particular correspond to a command by which a user of the lock may indicate that he wants to transmit the round hoop from the closed position into the open position and said opening command may generally be transmittable in the same way as the closing command. In particular in embodiments in which the round hoop is preloaded towards the open position, the round hoop may automatically move from the closed position into the open position as a result of the rotation of the cam into the release position and the movement of the latch into the unlocking position, wherein the latch may then be automatically secured in the locking position by rotating the cam into the blocking position after the detection of the open position by the hoop detector and the round hoop may be blocked against a movement into the open position.

In some embodiments, the control device may also be configured to control the electric motor to move the cam into the blocking position after a predefined or predefinable waiting time after the opening command when the hoop detector detects the closed position. In this regard, provision may also be made after receiving an opening command to secure the latch in the locking position again if, despite the opening command, no movement out of the closed position has taken place after the waiting time has elapsed. This may in particular be provided in embodiments in which the round hoop is not preloaded into the open position, but must be moved deliberately and in particular manually by actuating a handle from the closed position into the open position.

In some embodiments, provision may furthermore be made that the cam may be rotated from the release position via the preloading position into the blocking position. In such embodiments, provision may therefore be made that the cam must be rotated via the preloading position anyway for the rotation from the release position into the blocking position so that the cam may always be rotated along a constant direction of rotation after the transfer of the latch into the unlocking position in order to ultimately reach the blocking position. However, the rotation of the cam does not have to take place continuously in this respect; rather, the control device may be configured to stop the cam in the preloading position by controlling the electric motor accordingly and to rotate the cam into the blocking position, by controlling the electric motor, only in response to a signal from the hoop detector that detects the round hoop in the closed position. When transferring the round hoop from the closed position into the open position, provision may, however, be made—in particular if the round hoop is preloaded into the open position—that the control device is configured to control the electric motor to continuously rotate the cam from the release position into the blocking position when the open position is detected.

In embodiments without preloading of the round hoop, provision may, however, also be made as a result of the opening command to rotate the cam into the preloading position after leaving the closed position, to enable a snapping of the latch into the open position engagement recess on reaching the open position, and only thereafter to rotate the cam from the preloading position into the blocking position.

In embodiments in which the round hoop is not preloaded towards the open position, the control device may in particular be configured to control the electric motor, after the rotation of the cam into the release position due to the opening command received, to rotate the cam into the preloading position only in response to a signal of the hoop detector that characterizes a movement of the round hoop out of the closed position. The latch may thereby snap into an open position engagement recess on reaching the open position, wherein the control device may then control the electric motor to rotate the cam into the blocking position in response to a detection of the open position of the round hoop.

For example, the control device may control the electric motor to rotate the cam into the preloading position when the hoop detector no longer emits a signal that indicates an arrangement of the round hoop in the blocking position so that the interruption of this signal may characterize a movement of the round hoop out of the closed position. Furthermore, in some embodiments, the further sensor already mentioned above and/or even a further sensor may also be provided to detect the leaving of the closed position.

In some embodiments, the electric motor may only be configured to move the cam between the release position and the blocking position. The cam may in particular be rotatable by 180 degrees from the release position into the blocking position, and vice versa.

Furthermore, in some embodiments, the preloading position may be reachable by rotating the cam by 90 degrees starting from the blocking position and starting from the release position.

Furthermore, in some embodiments, the blocking position may be defined by a rotational position of the cam in which the cam and/or a control prolongation of the cam has a minimum spacing from the round hoop in the radial direction, whereas the release position may be defined by a rotational position of the cam in which the cam and/or the control prolongation has a maximum spacing from the round hoop in the radial direction. If the blocking position and the release position are arranged offset by 180 degrees from one another and the preloading position is arranged offset by 90 degrees from these positions, the cam and/or the control prolongation may, in the preloading position, in particular in the radial direction have an average spacing from the round hoop with respect to the maximum spacing and the minimum spacing to enable a movement of the latch between the unlocking position and the locking position.

Furthermore, in some embodiments, the cam may be rotatable along a first direction of rotation from the blocking position into the release position and along a second direction of rotation opposite the first direction of rotation from the release position into the blocking position.

In such embodiments, the rotation of the cam may thus be limited to a rotation between the release position and the blocking position so that the release position and the blocking position may define respective end positions of the cam with respect to its rotations. In particular, the cam may therefore always be rotatable via the preloading position if the cam is rotated from the release position into the closed position, or vice versa. Furthermore, the release position and the blocking position may be diametrically opposite one another with respect to the rotation of the cam in such embodiments. Such a limitation of the rotation of the cam may in particular also enable a compact design of the frame lock in that in particular the control opening does not have to provide space for a complete rotation of the cam by 360 degrees, but rather, in particular perpendicular to the direction of movement of the latch, only has to have an extent corresponding to the range of movement of the cam, and in particular of a control prolongation of the cam engaging into the control opening, during the limited rotation.

In some embodiments, the hoop detector may comprise at least one permanent magnet at the round hoop and a stationary magnetic field sensor. The stationary magnetic field sensor may in particular be arranged in the environment of the latch to detect when the round hoop is in the closed position by detecting the permanent magnet. For this purpose, the permanent magnet may in particular be arranged in the environment of the closed position engagement recess.

Furthermore, in some embodiments, provision may be made that the round hoop has at least two permanent magnets, with a detection of a first of the two permanent magnets characterizing the closed position and a detection of a second of the two permanent magnets characterizing the open position of the round hoop. For example, the permanent magnets may be arranged in the environment of the closed position engagement recess and/or the open position engagement recess.

In some embodiments, the at least two permanent magnets may have opposite orientations of the polarity (north-south or south-north). In such embodiments, the permanent magnets may trigger different signals at the magnetic field sensor so that the control device may distinguish based on the received signals whether the round hoop is in the open position or in the closed position.

Furthermore, in some embodiments, the hoop detector may, for example, comprise a mechanical contact switch and/or a capacitive proximity switch to be able to detect the closed position and/or the open position.

In some embodiments, a motor shaft of the electric motor may be connected to a potentiometer and the control device may be configured to determine a rotational position of the cam based on the signals of the potentiometer. The control device may in particular be configured to detect a voltage at the potentiometer that changes as a result of the rotation of the motor shaft of the electric motor and to draw conclusions about the rotational position of the cam as a result of the detected voltage. This may in particular also make it possible to detect the preloading position of the cam to be able to stop the electric motor on reaching the preloading position, for example. Such a detection of rotational positions based on the signals of a potentiometer is generally known to the skilled person so that it is not necessary to go into detail here.

In general, the closed position engagement recess and/or the aforementioned open position engagement recess may be formed directly in the round hoop or indirectly by one or more elevated portion(s) of the round hoop.

Furthermore, the disclosure of DE 10 2005 041 268 A1 is explicitly included in the present disclosure with regard to the basic design of a frame lock and the features explained therein may also be realized in embodiments of the frame lock of the kind disclosed herein if they do not contradict the above explanations.

The invention will be explained in the following purely by way of example with reference to an embodiment and to the drawings. First, however, the basic mode of operation of an electronic frame lock will be explained using a frame lock known from DE 10 2005 041 268 A1.

DRAWINGS

There are shown in the Figures:

FIGS. 2A to 2C are respective representations of details of an embodiment of an electronic frame lock according to the present disclosure with a cam positioned in a blocking position, a cam positioned in a preloading position and a cam positioned in a release position; and FIG. 3A is a schematic representation of a control opening of the latch.

DETAILED DESCRIPTION OF THE INVENTION

Figure 1A:
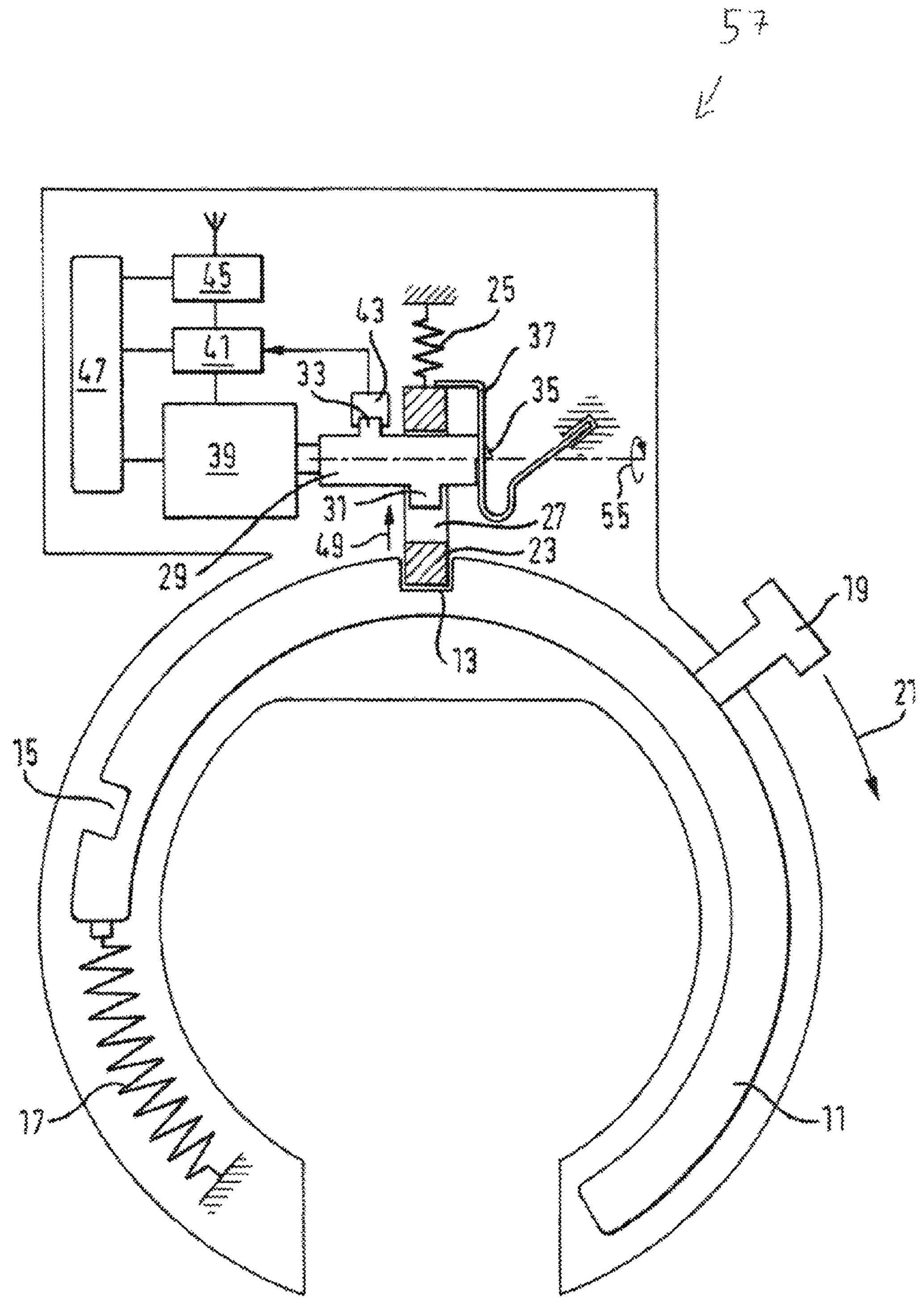
FIGS. 1A and 1B are respective representations of an electronic frame lock from the prior art with different positions of a latch and a round hoop of the frame lock.

FIG. 1A schematically shows the structure of a frame lock 57 for mounting at the rear wheel spokes of a bicycle according to the prior art DE 10 2005 041 268 A1. The frame lock 57 has a round hoop 11 for engaging around the rear wheel. The round hoop 11 has an open position engagement recess 13 and a closed position engagement recess 15 and is preloaded by means of a tension spring 17 towards an open position shown in FIG. 1A. As long as the round hoop 11 is not locked, it may be rotated against the preload along a closing direction 21 towards a closed position by means of a handle 19.

A latch 23, which is preloaded by a compression spring 25 towards a locking position shown in FIG. 1A, cooperates with the round hoop 11. The latch 23 has a central recess 27. A shaft 29, which has an unlocking cam 31 in the region of the latch 23, engages into said central recess 27. At another longitudinal section, the shaft 29 has a switching cam 33. The front side of the shaft 29 is designed as an eccentrically arranged slanted surface in the form of a release nose 35. Said release nose 35 cooperates with a blocking spring 37, as will be explained below.

An electric motor 39 is provided as the drive device for the shaft 29 and preferably has an integrated or mounted gear for a slowing down (not shown). The electric motor 39 is controlled by a control device 41. The control device 41 is connected at the input side to a contact switch 43 that cooperates with the switching cam 33 of the shaft 29. Furthermore, the control device 41 is connected at the input side to a radio receiver 45. A battery 47 (or accumulator) serves for the energy supply of the electric motor 39, the control unit 41 and the radio receiver 45.

The frame lock 57 shown in FIG. 1A serves to secure the associated bicycle against an unauthorized use. For this purpose, the round hoop 11 may be moved, starting from the open position shown, into a closed position in which the round hoop 11 engages into an intermediate space between two adjacent spokes of the rear wheel and thereby blocks the rear wheel.

The round hoop 11 may be locked both in the open position shown and in the closed position mentioned by means of the latch 23. For this purpose, the compression spring 25 urges the latch 23 towards the round hoop 11. As long as the shaft 29, with the unlocking cam 31, releases the latch 23 for this purpose, the latch 23 therefore contacts the upper side of the round hoop 11 or engages into one of the two engagement recesses 13, 15 if they are at the level of the latch 23. If the latch 23 engages into the open position engagement recess 13, the round hoop 11 is secured in the open position, as shown in FIG. 1A. If, however, the latch 23 engages into the closed position engagement recess 15, this corresponds to said closed position of the round hoop 11.

Figure 1B:
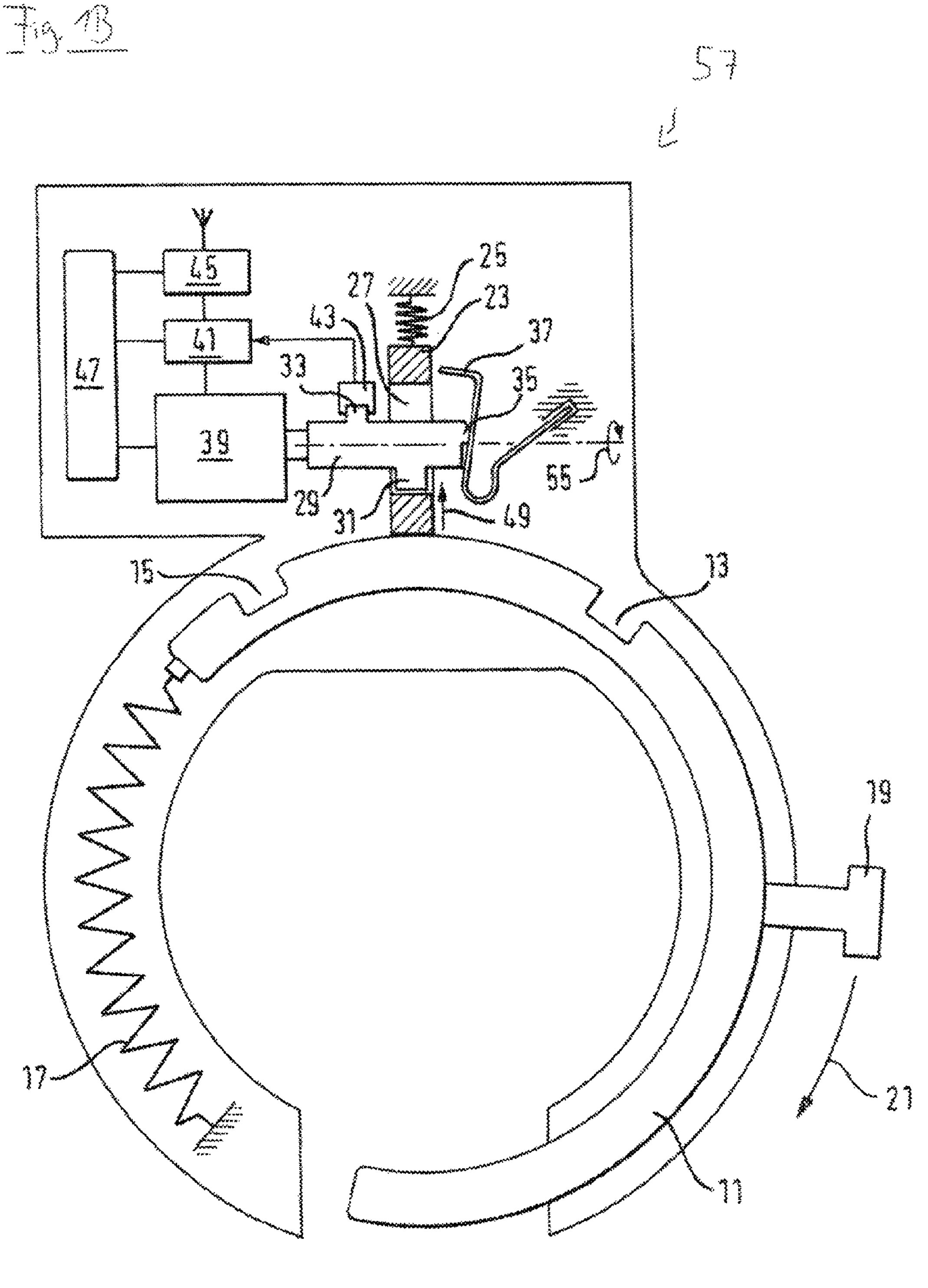

By rotating the shaft 29, the latch 23 may be briefly moved, by means of the unlocking cam 31, along an unlocking direction 49 against the preload by the compression spring 25 into an unlocking position. In this unlocking position, the round hoop 11 is released for a rotational movement. In particular, starting from the open position according to FIG. 1A, the user may move the round hoop 11 along the closing direction 21 by means of the handle 19 in order ultimately to move the round hoop 11 into the closed position already explained. FIG. 1B shows the frame lock during such a movement of the round hoop 11 in the closing direction 21. If, at this point in time, the unlocking cam 31 of the shaft 29 already releases the latch 23 again and the compression spring 25 thus urges the latch 23 towards the round hoop 11 again, this does not impair the further closing movement of the round hoop 11. As shown in FIG. 1B, the latch 23 namely only contacts the upper side of the round hoop 11 until the closed position engagement recess 15 is at the level of the latch 23. The latch 23 may then snap into the closed position engagement recess 15 to secure the round hoop 11 in the closed position thus reached.

The following property of the frame lock 57 can also be seen from FIG. 1B: If the user does not complete the closing actuation during the closing movement of the round hoop 11—i.e. while the latch 23 is located between the open position engagement recess 13 and the closed position engagement recess 15—and the latch 23 thus does not enter into engagement with the closed position engagement recess 15, the tension spring 17 again pulls the round hoop 11 back into the open position shown in FIG. 1A, wherein the latch 23 then snaps into the open position engagement recess 13 due to its preload (cf. FIG. 1A). In this case, the round hoop 11 is hereby also secured against an unauthorized or unintentional subsequent closing actuation. The same also applies in the event that, in the open position of the round hoop 11 shown in FIG. 1A, the latch 23 is indeed briefly unlocked as a result of a closing command issued by the user, but the round hoop 11 is not rotated at all in the closing direction 21 during this time interval. In this case, the round hoop 11 therefore remains in the open position and the latch 23 immediately re-engages into the open position engagement recess 13 as soon as the latch 23 has been released for this purpose due to a corresponding rotational movement of the shaft 29.

A further peculiarity of the frame lock 57 shown is the blocking spring 37. As long as the latch 23—as shown in FIG. 1A—is in the locking position, the blocking spring 37 engages behind the latch 23. This applies both to the open position shown in FIG. 1A and to the explained closed position of the round hoop 11. As long as the blocking spring 37 engages behind the latch 23 in this way, the latter is secured against an unauthorized unlocking movement according to the so-called "hammer blow method". To release the latch 23 for (authorized) movement in the unlocking direction 49, the blocking spring 37 is briefly urged back against the preload it exerts in order to bring the free end of the blocking spring 37 out of engagement with the latch 23. For this purpose, the release nose 35 of the shaft 29 engages at a compulsory guidance surface 51 of the blocking spring 37 that surrounds a blocking recess 53 of the blocking spring 37. However, as soon as the release nose 35 engages into the blocking recess 53, the blocking spring 37 may engage behind the latch 23 in the manner explained due to its preload (cf. FIG. 1A).

In the state according to FIG. 1B, the blocking spring 37 incidentally still laterally contacts the latch 23. However, as soon as the latch 23 fully returns to the locking position, the blocking spring 37 snaps into the blocking position shown in FIG. 1A and engages behind the latch 23 again.

In this frame lock 57 from the prior art, an element separate from the shaft 29 and the unlocking cam 31 is thus provided in the form of the blocking spring 37 to be able to protect the latch 23 in the locking position against a movement against the preload and thereby in particular against break-open attempts using the so-called hammer blow method. Furthermore, the preload of the latch 23 into the locking position indeed generally enables the latch 23 on reaching the closed position engagement recess 15 to engage into the latter, but this presupposes that the shaft 29 has already been rotated sufficiently far on reaching the closed position to release the latch 23. Until this sufficient rotation of the shaft 29, a user must therefore manually hold the round hoop 11 in the closed position to prevent the round hoop 11 from moving back into the open position due to the preload by the tension spring 17.

The embodiments of an improved electronic frame lock disclosed herein particularly address this problem, wherein a non-limiting one of these embodiments is illustrated by reference now to FIGS. 2A through 3A. In this embodiment of a frame lock 57', a cam 59 and thus a single component serves both to urge a latch 65 preloaded into a locking position V against the preload into an unlocking position E and to secure the latch 65 in the locking position V against a movement towards the locking position V. Furthermore, a hoop detector 67 is provided that is configured to detect a closed position G of a round hoop 61, wherein the corresponding signal of the hoop detector 67 may be used by a control device 69 to control the cam 59 to secure the latch 65 in the locking position V and, as a result, to secure the round hoop 11 against an unwanted movement into an open position O. However, the basic design of the frame lock 57' may correspond to that of the above-explained frame lock 57 from the prior art, unless specific features are referred to below. Therefore, the features of the above-explained frame lock 57 from the prior art that relate to the basic mode of operation of a frame lock may also be realized in the further developed frame lock 57' according to FIGS. 2A to 3A. In particular, provision may therefore, for example, also be made in the frame lock 57' that its round hoop 61 is preloaded into an open position O.

Figure 2A:
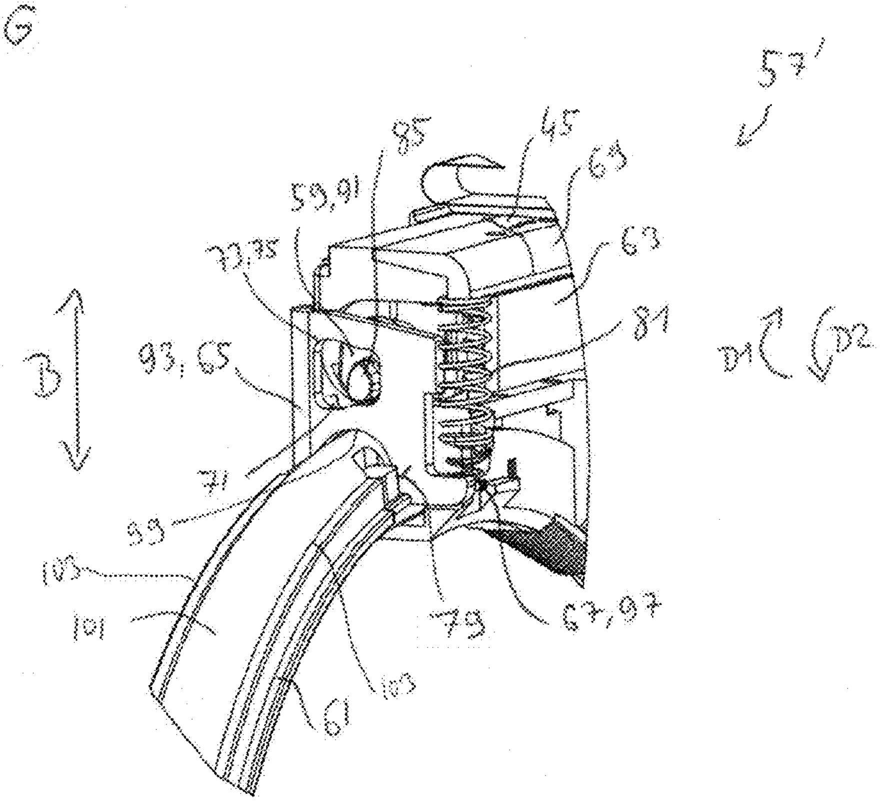

FIG. 2A shows the frame lock 57' with the round hoop 61 located in the closed position G. In the closed position G, the round hoop 61 is secured by the latch 65, which is configured as a flat metal sheet 93, in that the latch 65 positioned in the locking position V engages into a closed position engagement recess 79 and thereby blocks the round hoop 61 against a rotational movement. The closed position engagement recess 79 may be formed directly in the round hoop 61 or indirectly by one or more elevated portion(s) of the round hoop 61.

As can furthermore be seen from FIG. 2A, the latch 65 has a concavely rounded recess 99 that faces the round hoop 61 and that engages around a convexly rounded section 101 of the round hoop 61 in the locking position V. The closed position engagement recess 79 is surrounded by lateral guide sections 103 of the round hoop 61.

The latch 65 further has a control opening 71 into which a control prolongation 85 of the cam 59 rotatable by an electric motor 63 engages. The control prolongation 85 projects away from a control plate 91 of the cam 59 towards the latch 65 and may be driven, by rotating the cam 59, to make an eccentric rotational movement about a motor rotation axis of the electric motor 63. This makes it possible, by rotating the cam 59 in accordance with the rotational movement of the cam 59 and a contour 73 of the control opening 71 that is formed by its outer boundary 75, to move the latch 65 in a straight line along a direction of movement B that is oriented radially to the round hoop 61 and perpendicular to an axis of rotation about which the rotational movement of the cam 59 takes place. In the embodiment shown here, the control plate 91 is pivotable about the axis of rotation of the cam 59 or the motor axis of rotation of the electric motor 63 and the control prolongation 85 is arranged at a radial end of the control plate 91 with respect to its pivot movement.

In the representation according to FIG. 2A, the round hoop 61 is in the closed position G and the latch 65 is in the locking position V in which the latch 65 engages into the closed position engagement recess 79. The latch 65 is preloaded by a compression spring 81 towards the locking position V so that the latch 65 would have to be moved against this preload to be able to bring the latch 65 out of engagement with the closed position engagement recess 79. However, to secure the latch 65 in the locking position V, the cam 59 is rotated by an appropriate control of the electric motor 63 into a blocking position S in which the control prolongation 85 contacts a boundary 75 of the control opening 71 facing the round hoop 61 and thereby blocks a movement of the latch 65 against the preload by the compression spring 81.

To enable an authorized user to lock the frame lock 57' and to transfer the round hoop 61 into the closed position G shown in FIG. 2A, the frame lock 57' has a control device 69 that is configured to control the electric motor 63 and to thereby drive the cam 59. Furthermore, in the frame lock 57' shown here, a radio receiver 45 is also provided in order, for example, to be able to receive a closing command from a smartphone, according to which the frame lock 57' is to be blocked and the round hoop 61 is to be transferred into the closed position G.

The control device 69 may be configured, in response to such a closing command and starting from the open position O illustrated in FIG. 2C, to first control the electric motor 63 to rotate the cam 59 into a release position F likewise illustrated in FIG. 2C. In the course of this rotation of the cam 59, the control prolongation 85 abuts a boundary 75 of the control opening 71 facing away from the round hoop 61 and thereby urges the latch 65 against the preload of the compression spring 81 into an unlocking position E. In the unlocking position E, the latch 65 comes out of engagement with an open position engagement recess 77 into which the latch 65 engages when the round hoop 61 is in the open position O and the latch 65 is in the locking position V. This enables a user to move the round hoop 61 towards or into the closed position G by means of handle 19. The movement towards the closed position G may in particular take place against a preload of the round hoop 61 towards the open position O, wherein the preload may, for example, be generated by a tension spring 17, as shown in FIGS. 1A and 1B.

Figure 2B:
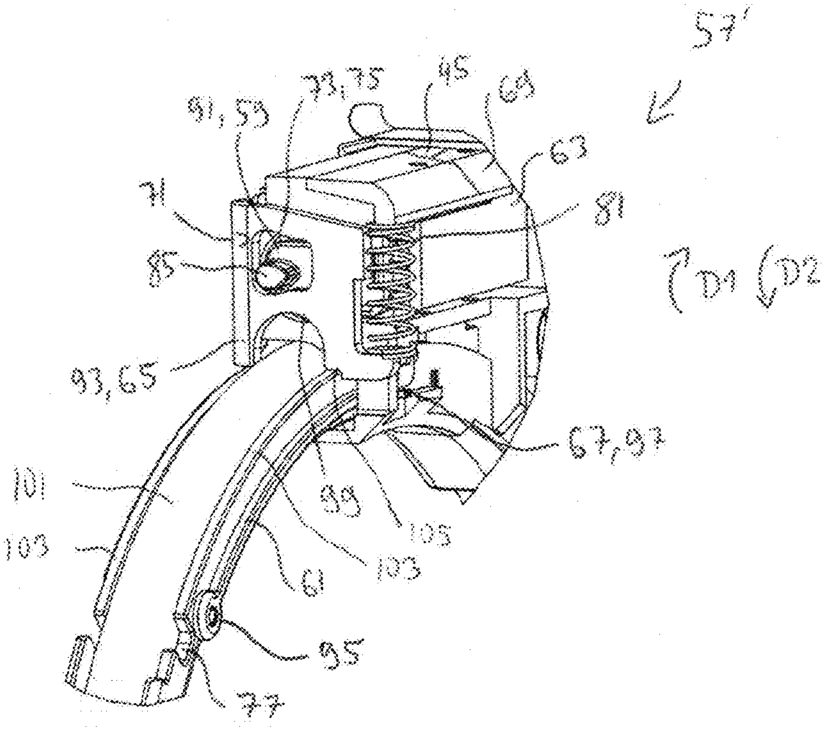
Figure 20:
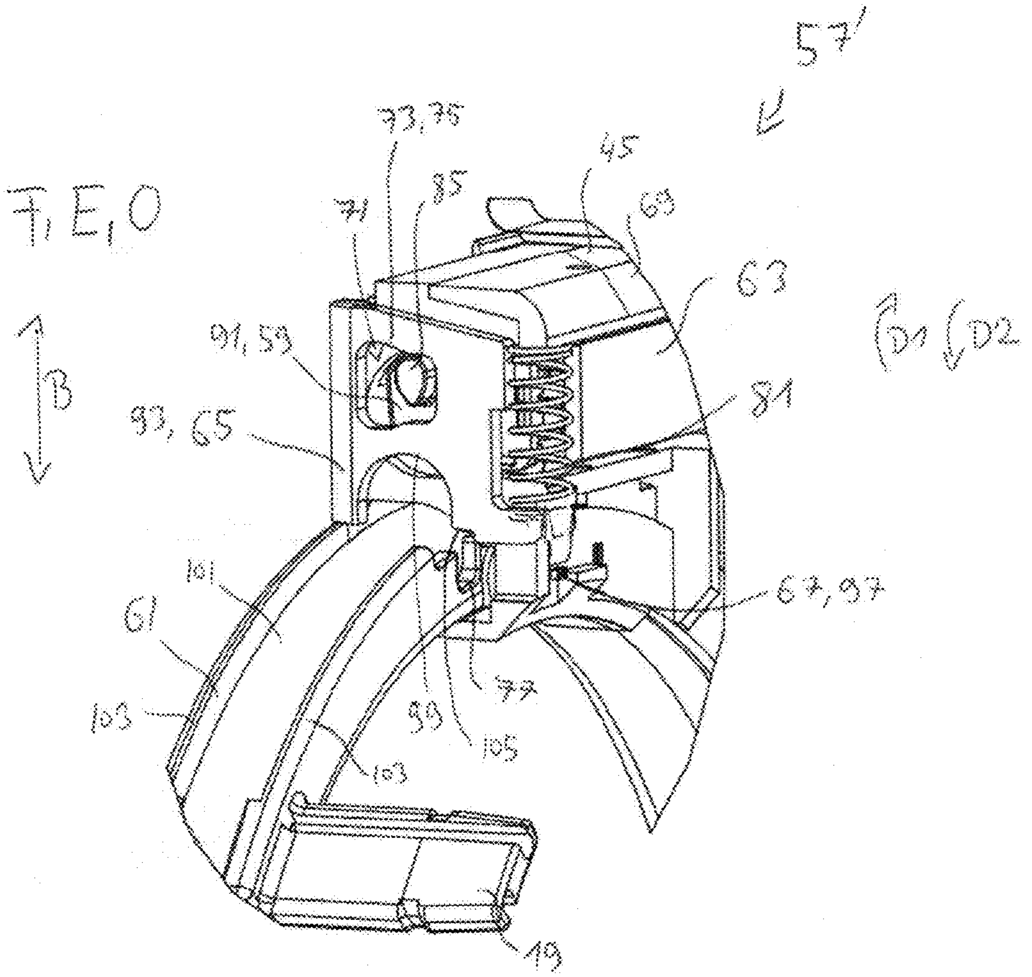
Figure 34:
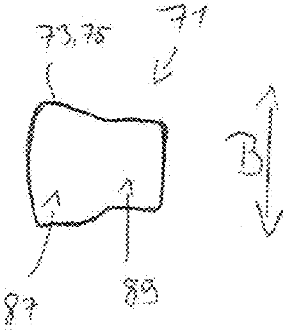

After reaching the release position F, the control device 69 may be configured to then control the electric motor 63 to rotate the cam 59 into a preloading position T which is illustrated in FIG. 2B and in which the latch 65 is released for a movement against the preload by the compression spring 81. As FIG. 2B illustrates, the preloading position T makes it possible to urge the latch 65 back against the preload so that the latch 65 may, for example, slide along the round hoop 61 during a movement of the round hoop 61 into the closed position G. As FIG. 2B illustrates, the latch 65 contacts the guide sections 103 of the round hoop 61 during such a sliding and encloses the guide sections 103 at the outside with respective centering sections 105 to be able to guide the rotational movement of the round hoop 61 into the closed position G.

However, the preloading of the latch 65 into the locking position V enables the latch 65 to snap directly into the locking position V when the cam 59 is rotated into the preloading position T and to engage into the closed position engagement recess 79 as soon as the round hoop 61 reaches the closed position G (cf. also FIG. 2A). In this regard, due to the rotation of the cam 59 into the preloading position T, the round hoop 61 may be secured against a movement towards the open position O immediately on reaching the closed position G without a user having to manually hold the round hoop 61 in this position.

Furthermore, in the frame lock 57', the already mentioned hoop detector 67 is provided that has a magnetic field sensor 97 and a permanent magnet 95, which is provided at the round hoop 61, in the immediate vicinity of the open position engagement recess 77, wherein a further permanent magnet, not visible in the Figures, may furthermore be provided in the immediate vicinity of the closed position engagement recess 79. Due to the cooperation of the permanent magnet, not shown, with the magnetic field sensor 97, the hoop detector 67 may detect when the round hoop 61 reaches the closed position G and report this to the control device 69. The control device 69 may be configured, in response to the detection of the closed position G, to control the electric motor 63 to rotate the cam 59 into the blocking position S in order thereby to secure the latch 65 in the locking position V and to block it against a movement against the preload of the compression spring 81 towards the unlocking position E (cf. FIG. 2A).

On the one hand, the frame lock 57' thus so-to-say enables an automatic function in that the latch 65 may snap directly into the closed position engagement recess 79 on reaching the closed position G and may thereby secure the round hoop 61 against a movement into the open position O, wherein, on the other hand, a reliable securing of the latch 65 in the locking position V may furthermore be achieved by the automatic rotation of the cam 59 into the blocking position S in order in particular to protect the frame lock 57' against break-open attempts using the hammer blow method. Since this securing is achieved by the engagement of the control prolongation 85, and thus directly by the cam 59, no separate element such as the blocking spring 37 is required—unlike in the prior art—to block the latch 65 in the locking position V against unauthorized opening attempts.

As can furthermore be seen from FIGS. 2A to 2C, the release position F and the blocking position S of the cam 59 are diametrically opposite one another with respect to the rotation of the cam 59 and the cam 59 may be rotated by 180 degrees between the release position F and the blocking position S. Furthermore, due to the contour 73 of the control opening 71, the rotation of the cam 59 is limited to rotations between the release position F and the blocking position S and thus to rotations by an angle of rotation of 180 degrees, wherein the cam 59 is rotatable along a first direction of rotation D1 from the blocking position S into the release position F and along a direction D2 opposite the first direction of rotation D1 from the release position F into the blocking position S. A corresponding restriction of the rotational movement may moreover also be defined in a technical control aspect. Both when rotating from the blocking position S into the release position F and when rotating from the release position F into the blocking position S, the cam 59 therefore passes through the preloading position T that may in particular be reached by a respective rotation of the cam 59 by 90 degrees starting from the blocking position S or the release position F.

Furthermore, in the frame lock 57', as already mentioned, the permanent magnet 95 is arranged in the environment of the open position engagement recess 77 (FIG. 2B) so that the hoop detector 67 may also be configured to detect the open position O by the magnetic field sensor 97 detecting the permanent magnet 95 and transmitting a corresponding signal to the control device 69. The permanent magnet 95 and the already mentioned permanent magnet, not shown in the Figures, may in particular be poled differently for detecting the closed position G so that, based on the signals of the magnetic field sensor 97, it may be distinguishable which of the permanent magnets is located in its environment. The control device 69 may therefore be configured to distinguish between the open position O and the closed position G based on the signals of the hoop detector 67.

Such a detection of the open position O may, for example, enable the control device 69 to check whether the round hoop 61 was actually moved towards or into the closed position G as a result of a closing command received. If, however, the round hoop 61 is not moved and remains in the open position O, the control device 69 may be configured to control the electric motor 63 to move the cam 59 into the blocking position S after a predefined or predefinable waiting time after the closing command. It may hereby be achieved that, for example after an accidentally triggered closing command, the round hoop 61 is secured in the open position O again to prevent unwanted movements of the round hoop 61.

Furthermore, the control device 69 may be configured, after the cam 59 has been transferred into the release position F, to rotate the cam 59 into the preloading position T only when the hoop detector 67 detects a movement of the round hoop 61 out of the open position O and/or no longer transmits a signal that indicates an arrangement of the round hoop 61 in the open position O.

Furthermore, the control device 69 may also be configured, in response to an opening command in particular received at the radio receiver 45, starting from the closed position G of the round hoop 61, to first control the electric motor 63 to move the cam 59 into the release position F. The latch 65 may thereby be moved into the unlocking position E and the round hoop 61 may be released for a movement towards the open position O. In particular, the round hoop 61 may be moved directly into the open position O due to a preload when the round hoop 61 is released for such a movement, starting from the closed position G. The control device 69 may thereupon be configured to control the electric motor 63 to rotate the cam 59 into the blocking position S in response to a detection of the open position O by the hoop detector 67 in order to secure the round hoop 61 in the open position O again. The round hoop 61 may hereby also be reliably secured in the open position O by an engagement of the latch 65 into the open position engagement recess 77 and the blocking of the latch 65 in the locking position V.

FIG. 3A illustrates the design of the control opening 71 that has a preloading section 87 and a locking section 89. The preloading section 87 has a larger extent in the direction of the direction of movement B of the latch 65 compared to the locking section 89, wherein the control prolongation 85 of the cam 59 is arranged in the preloading section 87 in the preloading position T, but is arranged in the locking section 89 in the blocking position S and in the release position F (cf. also FIGS. 2A to 2C). This design of the control opening 71 makes it possible for the control cam 85 to contact respective opposite boundaries 75 of the control opening 71 in the release position F and in the blocking position S and to thereby either block the latch 65 in the locking position V or urge it into the unlocking position E against the preload by the compression spring 81, whereas the greater extent of the preloading section 87 enables a movement of the latch 65 relative to the control prolongation 85 when the cam 59 is rotated into the preloading position T and the control prolongation 85 is arranged in the preloading section 87.

Furthermore, it can be seen from FIGS. 2A and 2C that the blocking position S is defined by a position of the cam 59 in which the control prolongation 85 radially has the smallest spacing from the round hoop 61 with respect to the rotation of the round hoop 61, whereas, in the release position F, the control prolongation 85 of the cam 59 radially has the greatest spacing from the round hoop 61 with respect to the rotational movement executable by the cam 59. In the preloading position T, the control prolongation 85 is positioned at an average radial spacing from the round hoop 61 with respect to the spacing in the blocking position S and the release position F. The frame lock 57' may further comprise a potentiometer, not shown in the Figures, which is connected to a motor shaft of the electric motor 63, and the control device 69 may be configured to determine the rotational position of the cam 59 based on the signals of the potentiometer, in particular to enable an intentional rotation of the cam 59 into the preloading position T.

What is claimed is:

1. An electronic frame lock for a bicycle, comprising:

a round hoop that is rotatable between an open position and a closed position;

an electric motor;

a cam that is driven by the electric motor and that makes an eccentric rotational movement about an axis of rotation when driven by the electric motor;

a latch that is movable in a straight line between a locking position and an unlocking position, wherein the straight line is oriented perpendicularly to the axis of rotation and is oriented radially relative to the round hoop, and wherein the latch is preloaded towards the locking position;

a hoop detector configured to detect the closed position of the round hoop; and a control device, wherein the round hoop located in the closed position is secured by the latch against a movement towards the open position with the latch located in the locking position, and wherein the round hoop is released by the latch for a movement into the open position with the latch moved into the unlocking position, wherein the cam is rotatable by the electric motor into a blocking position, a preloading position, and a release position, wherein the latch has a control opening defining a contour into which the cam engages, wherein the latch is moved by rotating the cam and contacting the contour of the control opening by the cam, wherein movement of the latch is based on the rotational movement of the cam and the contour of the control opening contacted by the cam, wherein the latch is secured by the cam against a movement from the locking position towards the unlocking position when the cam is rotated into the blocking position and contacts the contour of the control opening, wherein the latch is released for a movement against the preload towards the unlocking position when the cam is rotated into the preloading position, and wherein the latch is moved by the cam against the preload into the unlocking position when the cam is rotated into the release position, and wherein the control device is configured to control the electric motor to selectively rotate the cam into the blocking position, the preloading position, and the release position, and wherein the control device is configured to control the electric motor to rotate the cam into the blocking position in response to a detection of the closed position of the round hoop by the hoop detector.

2. The electronic frame lock according to claim 1, wherein the round hoop has a closed position engagement recess, and wherein the latch is configured to engage into the closed position engagement recess in the locking position when the round hoop is in the closed position and to thereby secure the round hoop against a movement into the open position.

3. The electronic frame lock according to claim 1, wherein the control device is configured, starting from the open position of the round hoop, based on a received closing command, to first control the electric motor to rotate the cam into the release position and, thereby, move the latch into the unlocking position;

to then control the electric motor to rotate the cam into the preloading position; and to control the electric motor to rotate the cam into the blocking position in response to a detection of the closed position of the round hoop by the hoop detector.

4. The electronic frame lock according to claim 1, wherein the cam can be rotated about a motor rotation axis of the electric motor.

5. The electronic frame lock according to claim 1, wherein the electric motor is arranged substantially tangentially to the round hoop.

6. The electronic frame lock according to claim 1, wherein the cam has a control prolongation with which the cam engages into the control opening.

7. An electronic frame lock for a bicycle, comprising:

a round hoop that is rotatable between an open position and a closed position;

an electric motor;

a cam that is driven by the electric motor and that makes an eccentric rotational movement about an axis of rotation when driven by the electric motor;

a latch that is movable in a straight line between a locking position and an unlocking position, wherein the straight line is oriented perpendicularly to the axis of rotation and is oriented radially relative to the round hoop, and wherein the latch is preloaded towards the locking position;

a hoop detector configured to detect the closed position of the round hoop; and a control device, wherein the round hoop located in the closed position is secured by the latch against a movement towards the open position with the latch located in the locking position, and wherein the round hoop is released by the latch for a movement into the open position with the latch moved into the unlocking position, wherein the cam is rotatable by the electric motor into a blocking position, a preloading position, and a release position, wherein the latch has a control opening defining a contour into which the cam engages, wherein the latch is moved by rotating the cam and contacting the contour of the control opening by the cam, wherein movement of the latch is based on the rotational movement of the cam and the contour of the control opening contacted by the cam, wherein the latch is secured by the cam against a movement from the locking position towards the unlocking position when the cam is rotated into the blocking position, wherein the latch is released for a movement against the preload towards the unlocking position when the cam is rotated into the preloading position, and wherein the latch is moved by the cam against the preload into the unlocking position when the cam is rotated into the release position, and wherein the control device is configured to control the electric motor to selectively rotate the cam into the blocking position, the preloading position, and the release position, and wherein the control device is configured to control the electric motor to rotate the cam into the blocking position in response to a detection of the closed position of the round hoop by the hoop detector;

wherein the cam has a control prolongation with which the cam engages into the control opening;

wherein the control opening has a preloading section, which has a first extent along a direction of movement of the latch, and a locking section that has a second extent along the direction of movement of the latch that is smaller than the first extent, wherein the control prolongation of the cam is arranged in the preloading section in the preloading position and is arranged in the locking section in the release position and in the blocking position.

8. An electronic frame lock for a bicycle, comprising:

a round hoop that is rotatable between an open position and a closed position;

an electric motor;

a cam that is driven by the electric motor and that makes an eccentric rotational movement about an axis of rotation when driven by the electric motor;

a latch that is movable in a straight line between a locking position and an unlocking position, wherein the straight line is oriented perpendicularly to the axis of rotation and is oriented radially relative to the round hoop, and wherein the latch is preloaded towards the locking position;

a hoop detector configured to detect the closed position of the round hoop; and a control device, wherein the round hoop located in the closed position is secured by the latch against a movement towards the open position with the latch located in the locking position, and wherein the round hoop is released by the latch for a movement into the open position with the latch moved into the unlocking position, wherein the cam is rotatable by the electric motor into a blocking position, a preloading position, and a release position, wherein the latch has a control opening defining a contour into which the cam engages, wherein the latch is moved by rotating the cam and contacting the contour of the control opening by the cam, wherein movement of the latch is based on the rotational movement of the cam and the contour of the control opening contacted by the cam, wherein the latch is secured by the cam against a movement from the locking position towards the unlocking position when the cam is rotated into the blocking position, wherein the latch is released for a movement against the preload towards the unlocking position when the cam is rotated into the preloading position, and wherein the latch is moved by the cam against the preload into the unlocking position when the cam is rotated into the release position, and wherein the control device is configured to control the electric motor to selectively rotate the cam into the blocking position, the preloading position, and the release position, and wherein the control device is configured to control the electric motor to rotate the cam into the blocking position in response to a detection of the closed position of the round hoop by the hoop detector;

wherein the cam has a control prolongation with which the cam engages into the control opening;

wherein the control prolongation, in the release position, contacts a boundary of the control opening facing away from the round hoop and, in the blocking position, contacts a boundary of the control opening facing the round hoop.

9. The electronic frame lock according to claim 1, wherein the latch is configured as a flat metal sheet.

10. The electronic frame lock according to claim 1, wherein the round hoop is preloaded into the open position.

11. The electronic frame lock according to claim 1, wherein the hoop detector is configured to detect the open position.

12. The electronic frame lock according to claim 11, wherein the control device is configured to control the electric motor, after the rotation of the cam into the release position, to rotate the cam into the preloading position only in response to a signal of the hoop detector indicating a movement of the round hoop out of the open position.

13. The electronic frame lock according to claim 11, wherein the control device is configured, as a result of receiving the closing command, to control the electric motor to move the cam into the blocking position after a predefined or predefinable waiting time if the hoop detector detects the open position after the predefined or predefinable waiting time.

14. The electronic frame lock according to claim 11, wherein the control device is configured, starting from the closed position of the round hoop, based on a received opening command, to first control the electric motor to rotate the cam into the release position and, thereby, to move the latch into the unlocking position; and to control the electric motor to rotate the cam into the blocking position in response to a detection of the open position of the round hoop by the hoop detector.

15. The electronic frame lock according to claim 1, wherein the round hoop has an open position engagement recess, and wherein the latch is configured to engage into the open position engagement recess in the locking position when the round hoop is in the open position and to thereby secure the round hoop against a movement into the closed position.

16. The electronic frame lock according to claim 1, wherein the cam can be rotated from the release position through the preloading position and into the blocking position.

17. The electronic frame lock according to claim 1, wherein the electric motor is only configured to move the cam between the release position and the blocking position.

18. The electronic frame lock according to claim 1, wherein the cam can be rotated by 180 degrees from the release position into the blocking position, and vice versa.

19. The electronic frame lock according to claim 1, wherein the cam can be rotated along a first direction of rotation from the blocking position into the release position and along a second direction of rotation opposite the first direction of rotation from the release position into the blocking position.

20. The electronic frame lock according to claim 1, wherein the hoop detector comprises at least one permanent magnet at the round hoop and a stationary magnetic field sensor.

* * * * *